(No Model.)
J. A. RUBE.
HARROW.
No. 464,522. Patented Dec. 8, 1891.
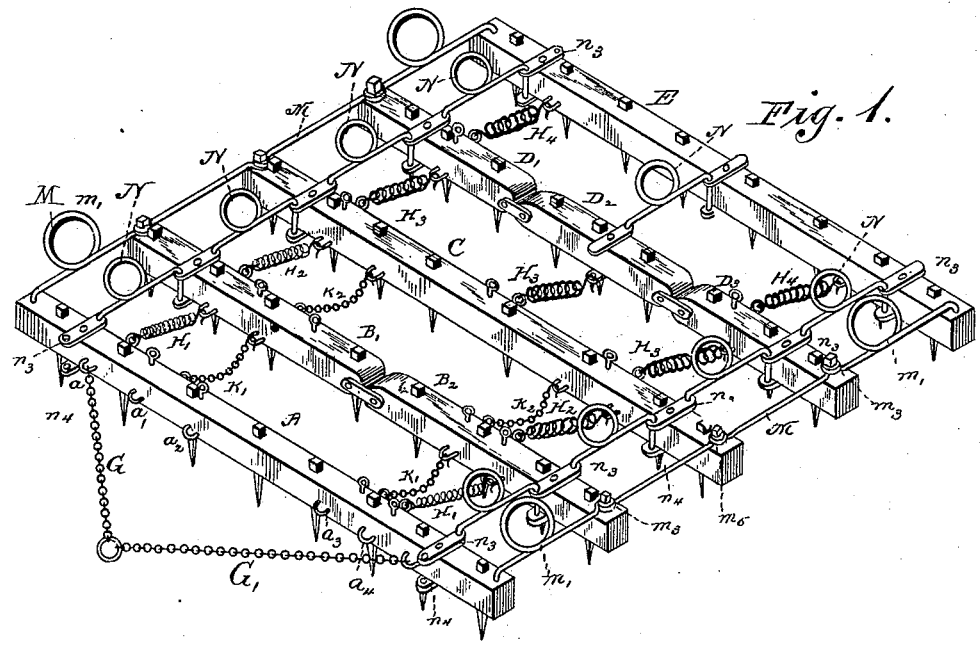
Fig. 1.
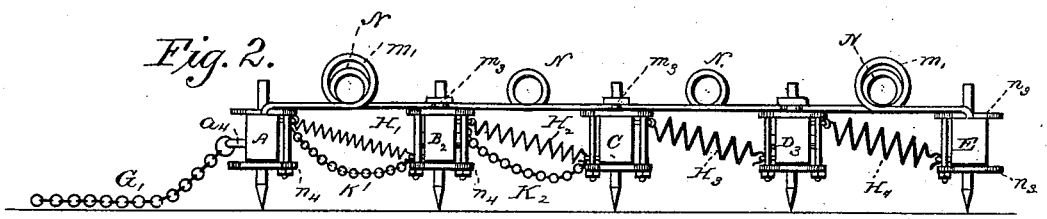
Fig. 2.
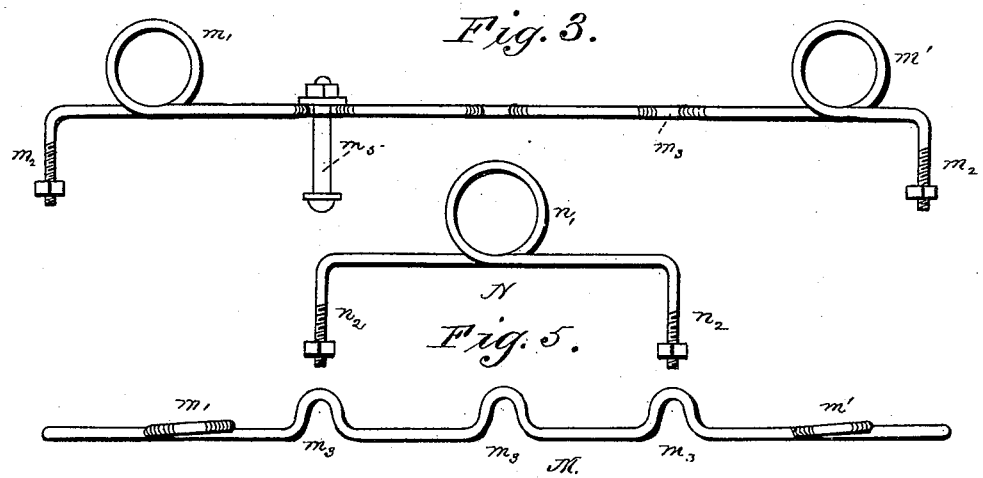
Fig. 3.
Fig. 5.
Fig. 4.
Witnesses
N. B. Harris
J. L. Wilson
Inventor
John A. Rube
by
Whitman & Wilkinson
Attorneys

UNITED STATES PATENT OFFICE.

JOHN A. RUBE, OF BEEBE, ARKANSAS.

HARROW.

SPECIFICATION forming part of Letters Patent No. 464,522, dated December 8, 1891.

Application filed February 25, 1891. Serial No. 382,836. (No model.)

*To all whom it may concern:*

Be it known that I, JOHN A. RUBE, a citizen of the United States, residing at Beebe, in the county of White and State of Arkansas, have invented certain new and useful Improvements in Harrows; and I do hereby declare the following to be a full, clear, and exact description of the invention, such as will enable others skilled in the art to which it appertains to make and use the same.

My invention relates to certain improvements in harrows, whereby the danger of breaking or bending the teeth from striking rocks, stumps, or roots is obviated and the necessity of having different widths of harrows and different teeth and weights for different grades of work is done away with. In addition to these I have made certain other improvements, which will be best understood by reference to the accompanying drawings, wherein the same parts are indicated by the same letters.

Figure 1 is a perspective view of my improved harrow. Fig. 2 is a side elevation of the same. Fig. 3 is a side elevation of my main side coupling-spring. Fig. 4 is a plan view of the same. Fig. 5 is a side elevation of one of my shorter springs.

My improved harrow is made of a number of parallel cross-pieces carrying teeth, some of which cross-pieces are sectional and some continuous. In the drawings I have shown five such cross-pieces; but the number of them is immaterial and any convenient number may be used. When using five such cross-pieces, I preferably have the first A, third C, and fifth E solid beams, while the second is preferably made of two separate beams B' and $B^2$, coupled together by bolt and clevis or in any other convenient way, and the fourth cross-piece is preferably made in three sections D', $D^2$, and $D^3$, similarly coupled. The teeth in the various cross-pieces are so arranged that no two are directly in line in the direction in which the harrow is drawn. I preferably use steel teeth, although teeth of wrought-iron, hard wood, or any other convenient material may be used. A is drawn directly by the team. B' and $B^2$ are connected to A by the taut stout spiral springs H' and H' and the slack chains K' and K'. C is connected to B' and $B^2$ by the taut stout spiral springs $H^2$ and $H^2$ and the slack chains $K^2$ $K^2$. In a similar way the three sections D', $D^2$, and $D^3$ are connected by three springs $H^3$ $H^3$ $H^3$, but without chains, which may be dispensed with in the rear sections, while the outer sections D' and $D^3$ drag the two ends of E by the springs $H^4$ $H^4$. I also add two long springs M, made of spring-steel, at each side of the harrow, connecting the rear section with the front section. The ends of this spring are bent at right angles, pass through the harrow-frame, and are secured by a nut and screw-thread $m^2$. Near each end of this spring M there is a bend in the form of a circle $m'$, and over each cross-piece of the harrow I have a bolt-hole or loop $m^3$, which, when a stiff draft is required, may be secured to each cross-piece by a bolt $m^4$, nut $m^5$, and washer $m^6$. I may only use one of these bolts, preferably on the middle cross-piece, as shown in Fig. 1. Ordinarily none of the bolts $m^4$ are used. Between each of the sections I also add the springs N, curved at $n'$, with ends $n^2$ bent rectangularly and engaging in links $n^3$ and $n^4$, secured above and below the cross-pieces A B, &c. The function of these springs is to assist the other springs in giving the teeth a quivering or dancing motion, which materially assists in breaking the clods up, while at the same time they give sufficient resistance to the sections against toppling over.

The various sections of the harrow, except the front section, (which is drawn directly by the team,) are ordinarily drawn by the springs, the chains being to prevent injury to the springs from overstraining and at the same time to do any specially heavy work that may be required.

Since the strain from the team is on the upper part of the harrow-tooth in a forward direction and that from the ground on the points of the teeth is in a backward direction, there is a strong tendency for the beams to topple over forward, throwing the teeth out of the ground to the rear. To partially obviate this, I supply the springs N and M, and I also have the spiral springs and the chains lead from eyebolts or rings near the top of the preceding cross-piece to eyebolts or rings near the bottom of the following cross-piece. The latter eyebolts then act as the fulcrum for two systems of levers, the one being the teeth of the harrow pressed against by the earth and tending to throw the teeth out backward, and the other being the drag of the after sections acting through a lever-arm equal to the depth or any desired part of the depth of the cross-beam and tending to throw the teeth in the opposite direction. Sometimes one of these forces will be greater and at others less than the other, and the rapid changes between the two will also add to the quivering of my harrow, tending to shatter the clods. Another great advantage of this yielding of the teeth to any great strain is that if a rock, stump, or other unyielding obstruction is struck the teeth will turn back and slide over it without bending or breaking, as with the harrows now in ordinary use. For the same reason my harrow will automatically clear itself of grass, weeds, or other matter tending to clog the motion of the teeth in the ground.

My object in having some of the cross-pieces whole and some in sections is that these sections, being made flexible, will conform to uneven surfaces and will harrow where long stiff sections would fail to work well.

Another feature of my invention is that I have provided in front of the first cross-piece a number of eyebolts $a$ $a'$ $a^2$ $a^3$, &c., into which I can secure the two chains G and G', forming the bridle by which the harrow is drawn. By hooking G and G' and shortening either one or both, if it be desired, to two eyebolts on either side of the central point of the cross-piece, but not the same distance from the center, the harrow will become lozenge-shaped and will cover a narrower path than when the cross-pieces are at right angles to this path. The width of the path may be regulated at will by hooking the ends of the bridle eccentrically and shortening upon one chain, lengthening the other, or by doing both. This feature renders my harrow very convenient for use between the rows of any growing crop.

Handles or other guides may be applied to the rear section, if desired.

Having now described my invention, what I claim, and desire to secure by Letters Patent of the United States, is—

1. In a harrow, the combination of a number of parallel cross-pieces carrying the teeth with a spring M, secured to the first and last cross-pieces of the harrow, said spring having spiral loops $m'$ near the extremities thereof and small loops $m^3$, adapted to engage bolts $m^5$, passing through the said cross-pieces, substantially as described.

2. In a harrow, the combination of a number of parallel cross-pieces carrying the teeth with a spring M, secured by means of screw-threaded ends $m^2$, bent at right angles to the body of the spring and nuts thereon to the first and last cross-pieces of the harrow, said spring having spiral loops $m'$ near the extremities thereof and small loops $m^3$, adapted to engage bolts $m^5$, passing through the said cross-pieces, substantially as described.

3. In a harrow, the combination of a number of parallel cross-pieces carrying the teeth with a spring M, secured to the first and last cross-pieces of the harrow, said spring having spiral loops $m'$ near the extremities thereof and small loops $m^3$, adapted to engage bolts $m^5$, passing through the said cross-pieces, with springs N between each of the said cross-pieces, said springs being made of resilient steel bent into a spiral $n'$ and having the ends $n^2$ bent at right angles, with a screw-thread and nut thereon, substantially as described.

4. A harrow composed of a number of cross-pieces having one long spring M, connecting the first and last cross-piece, with spiral springs H', H$^2$, H$^3$, and H$^4$, and springs N between each of the said cross-pieces, substantially as described.

5. A harrow composed of a number of cross-pieces having one long spring M, connecting the first and last cross-piece, with spiral springs H', H$^2$, H$^3$, and H$^4$, and springs N between each of the said cross-pieces, and slack chains K' and K$^2$ between the first two pairs of cross-pieces, substantially as described.

In testimony whereof I affix my signature in presence of two witnesses.

JOHN A. RUBE.

Witnesses:
   D. J. MENTORTE,
   W. B. BARNUM.